April 7, 1931.　　　L. E. ENDSLEY　　　1,799,680
RAILWAY RAIL BENDER
Filed Dec. 13, 1929
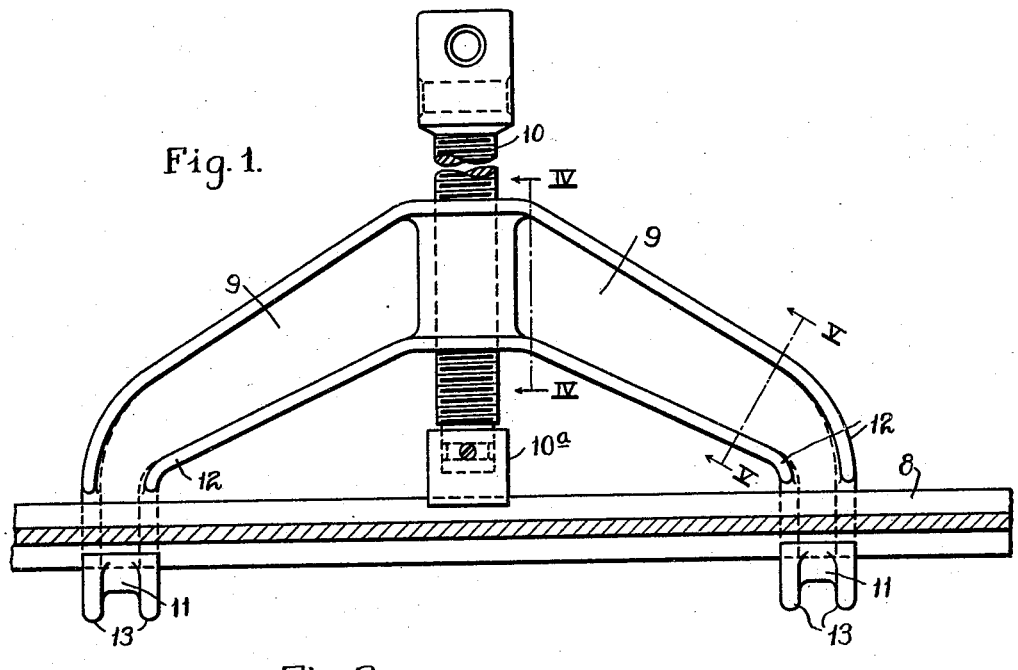
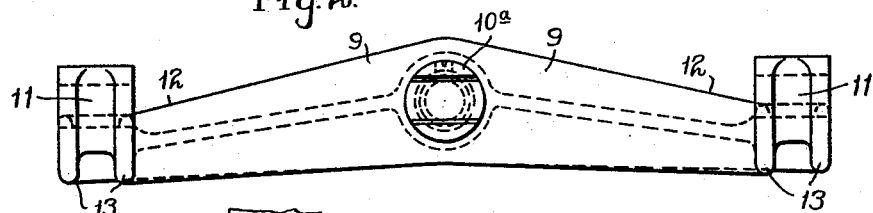
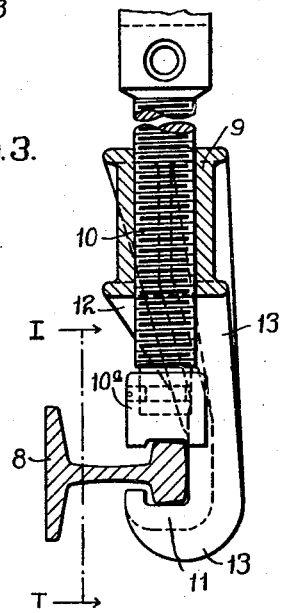
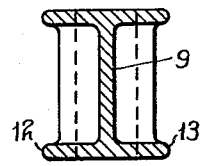
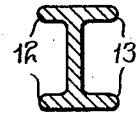
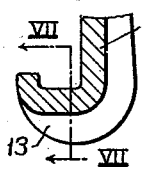
INVENTOR
Louis E. Endsley
By Archworth Martin,
Attorney.

Patented Apr. 7, 1931

1,799,680

UNITED STATES PATENT OFFICE

LOUIS E. ENDSLEY, OF PITTSBURGH, PENNSYLVANIA, ASSIGNOR TO VERONA TOOL WORKS, OF VERONA, PENNSYLVANIA, A CORPORATION OF PENNSYLVANIA

RAILWAY-RAIL BENDER

Application filed December 13, 1929. Serial No. 413,793.

My invention relates to devices that are more particularly adapted for the bending of railway rails but which may be employed in various other ways where very powerful thrust and pulling forces are desired.

One object of my invention is to provide a rail bender having maximum strength for a given weight of the material entering into the construction of the bender.

Another object of my invention is to provide a bender which, although it may be of cast metal, will have strength equal to or greater than various forms of forged benders as heretofore constructed.

Still another object of my invention is to provide a rail bender of generally improved form.

In the accompanying drawing, Figure 1 is an inverted plan view of the bender, taken on the line I—I of Fig. 3; Fig. 2 is a front elevational view thereof; Fig. 3 is a cross sectional view; Fig. 4 is a view taken on the line IV—IV of Fig. 1; Fig. 5 is a view taken on the line V—V of Fig. 1; Fig. 6 is a longitudinal sectional view of one of the hook portions, and Fig. 7 is a view taken on the line VII—VII of Fig. 6.

The bender is shown as applied to a railroad rail 8 in position to bend the same, and comprises a yoke 9, a screw 10 having threaded engagement with the yoke, and a cup 10ª which has swivel connection with the inner end of the screw in the usual manner.

My invention resides primarily in the peculiar form of the yoke, including its hook portions 11 that engage the rail head as shown more clearly in Fig. 3.

The main or body portion of the yoke 9 is in the form of an I-beam and is angularly-disposed with respect to the screw 10 and the rail 8. This angular arrangement reduces the tendency of the yoke to bend under the thrust of the screw 10 against the rail, as compared to a yoke or bar disposed in parallelism with the rail, and the I-beam section thereof is of course for the purpose of providing strength. The leg portions 9 of the yoke taper toward the ends thereof upon which the hooks 11 are formed, because so great strength is not required in those portions of the yoke which are adjacent to the hooks 11 as at the mid-portion thereof through which the screw 10 extends.

The hook portions 11 are of channel form in cross section, the flanges 12 of the I-beam section (Figs. 1 and 5) terminating at the inner end of the hook portion as shown in Fig. 1, and the flanges 13 being continued to substantially the outer extremity of each hook. The hooks are thus of great strength and nevertheless have smooth rail-engaging portions.

Not only does the yoke have great strength for a given weight of metal because of the angular disposition of the legs of the yoke and their tapering form, but it may be cast instead of formed by the more expensive forging operation, common in devices of this character where it has heretofore been felt that a casting would not have sufficient strength unless made excessively heavy, with consequent increased cost and difficult handling.

As shown more clearly in Fig. 3, the tapering of the yoke legs in their vertical dimensions is effected by inclining the legs at their undersides, upwardly from the mid-portion of the yoke toward the top of the rail head, the upper surfaces of the legs being in substantially a horizontal plane that is parallel to the top surfaces of the rail head. This arrangement permits of proper vertical positioning of the screw with respect to the rail and nevertheless permits of conveniently tapering the yoke legs to secure the greater strength that is required in the vicinity of the screw, and without the necessity of abrupt vertical bends in the yoke legs for the purpose of providing proper alinement of the screw and the hooks with respect to the rail head.

I claim as my invention:—

1. A rail bender comprising a yoke having legs adapted to rest upon a rail head, and provided with hooks for engaging the outer side of said head, and a screw extending in a horizontal direction through the mid-portion of the yoke and adapted to engage the inner side of the rail head, the upper sides of the leg portions lying in a plane substantially parallel to the plane of the rail head, the lower sides of said leg portions being inclined downwardly toward the mid-portion of the yoke so that the legs will be of tapered form, and the upper sides of the leg portions being of channel form with the flanges thereof extending around the said hook portions.

2. A rail bender comprising a yoke having legs adapted to rest upon a rail head, and provided with hooks for engaging the outer side of said head, and a screw extending in a horizontal direction through the mid-portion of the yoke and adapted to engage the inner side of the rail head, the upper sides of the leg portions lying in a plane substantially parallel to the plane of the rail head, and the lower sides of said leg portions being inclined downwardly toward the mid-portion of the yoke so that the legs will be of tapered form, and the lower sides of said leg portions being of channel form with the flanges thereof terminating at points adjacent to the rail head.

3. A rail bender comprising a yoke having legs adapted to rest upon a rail head and provided with end portions for engaging one side of said head, and a screw extending in a horizontal direction through the mid-portion of the yoke and engaging the other side of the rail head during normal use of the bender, the leg portions tapering toward the rail head, with their upper sides normally occupying a plane approximately parallel to the horizontal plane of said head and their lower sides inclined downwardly from the rail head toward the mid-portion of the yoke.

In testimony whereof I, the said LOUIS E. ENDSLEY, have hereunto set my hand.

LOUIS E. ENDSLEY.